US012597044B2

(12) United States Patent
Das et al.

(10) Patent No.: US 12,597,044 B2
(45) Date of Patent: Apr. 7, 2026

(54) TRANSFORMING QUALITATIVE SURVEY INTO QUANTITATIVE SURVEY USING DOMAIN KNOWLEDGE AND NATURAL LANGUAGE PROCESSING

(71) Applicant: Tata Consultancy Services Limited, Mumbai (IN)

(72) Inventors: Bhaskarjyoti Das, Pune (IN); Shivani Tarun Ganwani, Mumbai (IN); Sylvan Lobo, Thane (IN); Ravi Hanmant Mahamuni, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 6 days.

(21) Appl. No.: 18/760,920

(22) Filed: Jul. 1, 2024

(65) Prior Publication Data

US 2025/0054006 A1 Feb. 13, 2025

(30) Foreign Application Priority Data

Aug. 9, 2023 (IN) .............................. 202321053489

(51) Int. Cl.
  *G06Q 30/0203* (2023.01)
  *G06F 40/247* (2020.01)
  (Continued)

(52) U.S. Cl.
  CPC ....... *G06Q 30/0203* (2013.01); *G06F 40/247* (2020.01); *G06F 40/253* (2020.01);
  (Continued)

(58) Field of Classification Search
  None
  See application file for complete search history.

(56) References Cited

U.S. PATENT DOCUMENTS 9,373,086 B1 * 6/2016 Allen ....................... G06N 5/04
9,535,898 B2 * 1/2017 Baughman ............ G06F 40/205
  (Continued)

OTHER PUBLICATIONS

Bhaskarjyoti Das et al., "Dynamic User Research in Large-scale Service Design Projects," 23rd DMI: Academic Design Management Conference, 2022, vol. 18; Issue: 4, MDPI, https://www.researchgate.net/publication/363136264_Dynamic_User_Research_in_Large-scale_Service_Design_Projects.
  (Continued)

*Primary Examiner* — Richard L Bowen
(74) *Attorney, Agent, or Firm* — Finnegan, Henderson, Farabow, Garrett & Dunner, LLP

(57) ABSTRACT

The disclosure relates generally to methods and systems for transforming qualitative survey into quantitative survey. Current approaches depend on manual analysis of these user responses which is so troublesome task. The present disclosure transforms the qualitative survey questionnaire into the quantitative survey questionnaire using a domain knowledge and a natural language processing. The method first receives responses to each question present in qualitative survey questionnaire, from multiple batches. Then valid responses out of all the responses are determined for each question, pertaining to each batch, using domain taxonomy and natural language knowledge graph. Further, semantic relation-based technique is employed to determine the questions that are transformable batch wise. Then, the response options are created for each transformable question. The non-transformable questions are considered for the next batch and the responses pertaining to the next batch are processed and so on until all the questions becomes transformable.

12 Claims, 6 Drawing Sheets

(51) Int. Cl.
    G06F 40/253     (2020.01)
    G06F 40/289     (2020.01)
    G06F 40/30     (2020.01)
    G06F 40/40     (2020.01)

(52) U.S. Cl.
    CPC ............ G06F 40/289 (2020.01); G06F 40/30 (2020.01); G06F 40/40 (2020.01)

(56)           References Cited

U.S. PATENT DOCUMENTS

| | | | |
|---|---|---|---|
| 10,614,725 B2 * | 4/2020 | Boguraev | ............... G09B 7/00 |
| 2019/0066136 A1 * | 2/2019 | Kopikare | .............. G06N 5/046 |
| 2022/0230194 A1 | 7/2022 | Reynolds et al. | |
| 2024/0378527 A1 * | 11/2024 | Kalele | .................. G06F 3/0482 |

OTHER PUBLICATIONS

Marissa D. Abram et al., "Methods to Integrate Natural Language Processing Into Qualitative Research," International Journal of Qualitative Methods, 2020, vol. 189, Sage, https://journals.sagepub.com/doi/pdf/10.1177/1609406920984608.

* cited by examiner

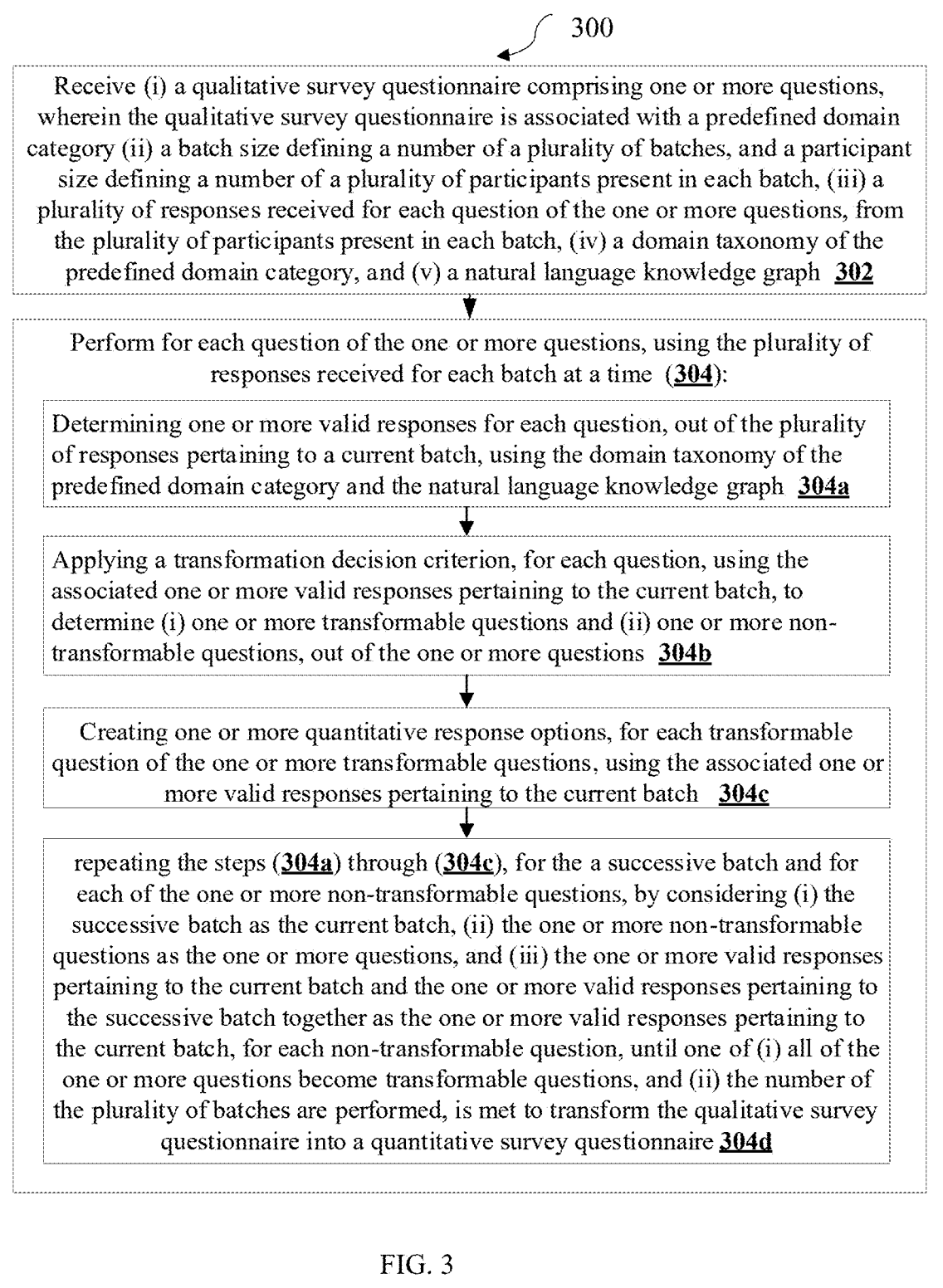

300

Receive (i) a qualitative survey questionnaire comprising one or more questions, wherein the qualitative survey questionnaire is associated with a predefined domain category (ii) a batch size defining a number of a plurality of batches, and a participant size defining a number of a plurality of participants present in each batch, (iii) a plurality of responses received for each question of the one or more questions, from the plurality of participants present in each batch, (iv) a domain taxonomy of the predefined domain category, and (v) a natural language knowledge graph 302

Perform for each question of the one or more questions, using the plurality of responses received for each batch at a time (304):

Determining one or more valid responses for each question, out of the plurality of responses pertaining to a current batch, using the domain taxonomy of the predefined domain category and the natural language knowledge graph 304a

Applying a transformation decision criterion, for each question, using the associated one or more valid responses pertaining to the current batch, to determine (i) one or more transformable questions and (ii) one or more non-transformable questions, out of the one or more questions 304b

Creating one or more quantitative response options, for each transformable question of the one or more transformable questions, using the associated one or more valid responses pertaining to the current batch 304c repeating the steps (304a) through (304c), for the a successive batch and for each of the one or more non-transformable questions, by considering (i) the successive batch as the current batch, (ii) the one or more non-transformable questions as the one or more questions, and (iii) the one or more valid responses pertaining to the current batch and the one or more valid responses pertaining to the successive batch together as the one or more valid responses pertaining to the current batch, for each non-transformable question, until one of (i) all of the one or more questions become transformable questions, and (ii) the number of the plurality of batches are performed, is met to transform the qualitative survey questionnaire into a quantitative survey questionnaire 304d

FIG. 3

Identifying one or more verbs and one or more aspects from a question, using a natural language processing technique 304a1

Identifying one or more aspects from each response received for the question, using the natural language processing technique 304a2

Determining an aspect sematic relation score for each response, based on (i) each of the one or more aspects identified from the question and (ii) each of the one or more aspects identified from the associated response, using the domain taxonomy of the predefined domain category 304a3

Identifying one or more phrases that are related to one or more verbs identified from the question, from each response associated to the question, using the natural language knowledge graph 304a4

Determining a verb-phrase sematic relation score for each response, based on each of the one or more phrases that are related to one or more verbs identified from the question, using the natural language knowledge graph 304a5

Calculating a response length for each response, based on a number of characters present in the associated response 304a6

Determining the one or more valid responses for each question, out of the plurality of responses, based on (i) the aspect sematic relation score for the associated response, (ii) the verb-phrase sematic relation score for the associated response, and (iii) the response length for the associated response 304a7

FIG. 4

Forming one or more synonymous phrase sets, for each question, from the associated one or more valid responses pertaining to the current batch, using the natural language knowledge graph, wherein each synonymous phrase set comprises one or more synonymous phrases present in the associated one or more valid responses 304b1

Calculating a frequency of occurrence for each synonymous phrase set, based on a number of the one or more synonymous phrases present in the associated synonymous phrase set, for each question 304b2

Identifying one or more synonymous phrase sets having the frequency of occurrence greater than or equal to a synonymous phrase frequency occurrence threshold, for each question 304b3

Forming one or more aspect sets, for each question, from the associated one or more valid responses pertaining to the current batch, using the domain taxonomy based on a parent-child relationship, wherein each aspect set comprises one or more aspects present in the associated one or more valid responses 304b4

Calculating a frequency of occurrence for each aspect set, based on a number of the one or more aspects present in the associated aspect set, for each question 304b5

Identifying one or more aspect sets having the frequency of occurrence greater than or equal to an aspect frequency occurrence threshold, for each question 304b6

Determining (i) the one or more transformable questions and (ii) the one or more non-transformable questions, out of the one or more questions, by applying the transformation decision criterion for each question, wherein the transformation decision criterion comprises: (i) if the current batch is a first batch, then tag the one or mor questions as the one or more non-transformable questions; and (b) if a difference in a variance of frequency of occurrence for each aspect set in the current batch and in a previous batch is less than a predefined first threshold, and (b) if the difference in the variance of frequency of occurrence for each synonymous phrase set in the current batch and in the previous batch, is less than a predefined second threshold, for the question, then add the associated question to the one or more transformable questions, otherwise add the associated question to the one or more non-transformable questions 304b7

FIG. 5

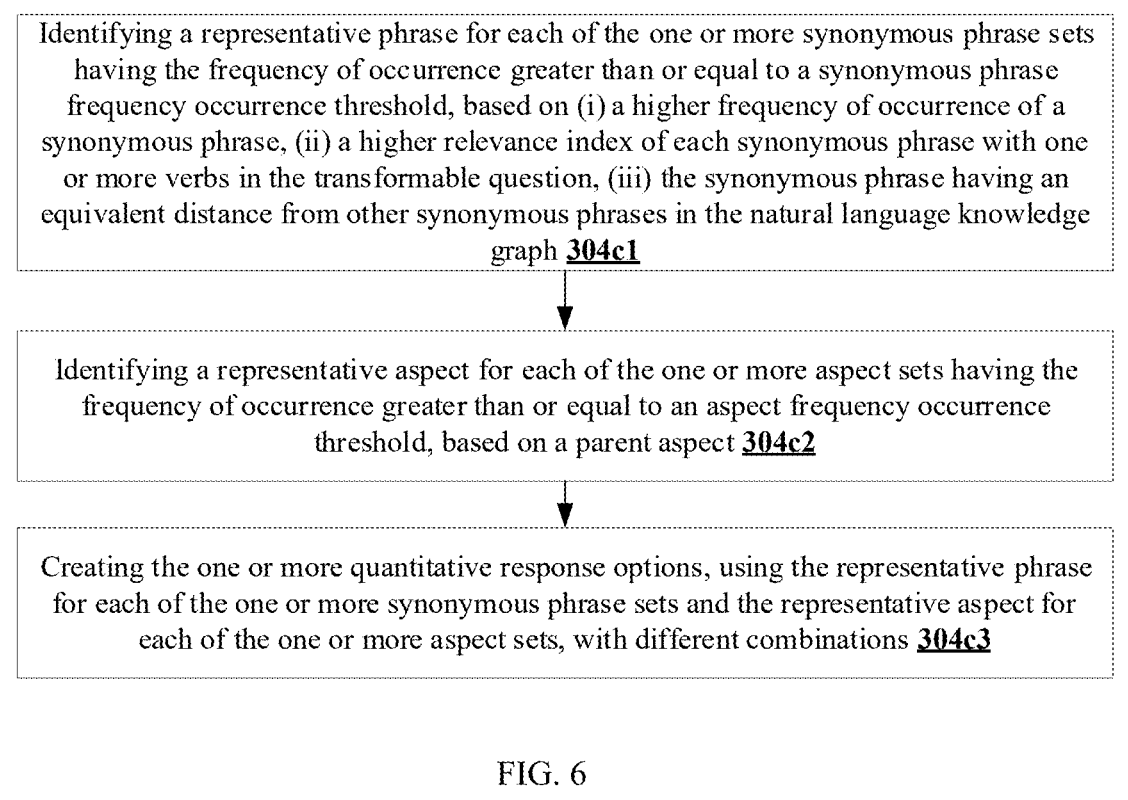

Identifying a representative phrase for each of the one or more synonymous phrase sets having the frequency of occurrence greater than or equal to a synonymous phrase frequency occurrence threshold, based on (i) a higher frequency of occurrence of a synonymous phrase, (ii) a higher relevance index of each synonymous phrase with one or more verbs in the transformable question, (iii) the synonymous phrase having an equivalent distance from other synonymous phrases in the natural language knowledge graph 304c1

Identifying a representative aspect for each of the one or more aspect sets having the frequency of occurrence greater than or equal to an aspect frequency occurrence threshold, based on a parent aspect 304c2

Creating the one or more quantitative response options, using the representative phrase for each of the one or more synonymous phrase sets and the representative aspect for each of the one or more aspect sets, with different combinations 304c3

FIG. 6

TRANSFORMING QUALITATIVE SURVEY INTO QUANTITATIVE SURVEY USING DOMAIN KNOWLEDGE AND NATURAL LANGUAGE PROCESSING

PRIORITY CLAIM

This U.S. patent application claims priority under 35 U.S.C. § 119 to: Indian Patent Application number 202321053489, filed on Aug. 9, 2023. The entire contents of the aforementioned application are incorporated herein by reference.

TECHNICAL FIELD

The disclosure herein generally relates to the field of generating surveys, and more specifically to methods and systems for transforming qualitative survey into quantitative survey using domain knowledge and natural language processing.

BACKGROUND

In ground theory-based design research studies, the investigative areas in a research problem are analyzed from user responses to qualitative survey questionnaire through surveys. These user responses are generally in unstructured form and may not always be valid and relevant to associated questions present in the qualitative survey questionnaire. Further, current approaches depend on manual analysis of these user responses which are time consuming, extremely complex, and need lot of efforts and hence are troublesome approaches. Further, interpretation of these user responses is extremely difficult especially in case of huge number of responses.

Hence, a quantitative survey questionnaire with right options is an alternative solution for the research studies instead of the troublesome qualitative survey questionnaire. However, existing technologies that help the design researchers to arrive at the right options are very limited and mostly manual works. The design researchers should have their skill, knowledge, and sometimes required to do secondary research, to construct the right options to the quantitative survey questionnaire. Also, the design researchers need extensive knowledge and literature survey to arrive at the right options but may still miss out as the ground reality can be different, contextual to the actual problem scenario. Further, the design researcher may not have enough information about the on-ground situation to form closed ended questions with suitable options. During the process of constructing the quantitative survey questionnaire, the design researchers may introduce bias if they provide these options on their own. When the design researchers conduct qualitative research, there is a lot of quantitative data embedded in the responses which is difficult to directly extract and analyze. Hence existing technologies that help the design researchers to arrive at the right options for the quantitative survey questionnaire are very limited, inaccurate, and inefficient.

SUMMARY

Embodiments of the present disclosure present technological improvements as solutions to one or more of the above-mentioned technical problems recognized by the inventors in conventional systems.

In an aspect, a processor-implemented method for transforming qualitative survey into quantitative survey using domain knowledge and natural language processing is provided. The method including the steps of: receiving (i) a qualitative survey questionnaire comprising one or more questions, wherein the qualitative survey questionnaire is associated with a predefined domain category (ii) a batch size defining a number of a plurality of batches, and a participant size defining a number of a plurality of participants present in each batch, (iii) a plurality of responses received for each question of the one or more questions, from the plurality of participants present in each batch, (iv) a domain taxonomy of the predefined domain category, and (v) a natural language knowledge graph; and performing for each question of the one or more questions, using the plurality of responses received for each batch at a time: (a) determining one or more valid responses for each question, out of the plurality of responses pertaining to a current batch, using the domain taxonomy of the predefined domain category and the natural language knowledge graph; (b) applying a transformation decision criterion, for each question, using the associated one or more valid responses pertaining to the current batch, to determine (i) one or more transformable questions and (ii) one or more non-transformable questions, out of the one or more questions; (c) creating one or more quantitative response options, for each transformable question of the one or more transformable questions, using the associated one or more valid responses pertaining to the current batch; and (d) repeating the steps (a) through (c), for the a successive batch and for each of the one or more non-transformable questions, by considering (i) the successive batch as the current batch, (ii) the one or more non-transformable questions as the one or more questions, and (iii) the one or more valid responses pertaining to the current batch and the one or more valid responses pertaining to the successive batch together as the one or more valid responses pertaining to the current batch, for each non-transformable question, until one of (i) all of the one or more questions become transformable questions, and (ii) the number of the plurality of batches are completed, to transform the qualitative survey questionnaire into a quantitative survey questionnaire.

In another aspect, a system for transforming qualitative survey into quantitative survey using domain knowledge and natural language processing is provided. The system includes: a memory storing instructions; one or more Input/Output (I/O) interfaces; and one or more hardware processors coupled to the memory via the one or more I/O interfaces, wherein the one or more hardware processors are configured by the instructions to: receive (i) a qualitative survey questionnaire comprising one or more questions, wherein the qualitative survey questionnaire is associated with a predefined domain category (ii) a batch size defining a number of a plurality of batches, and a participant size defining a number of a plurality of participants present in each batch, (iii) a plurality of responses received for each question of the one or more questions, from the plurality of participants present in each batch, (iv) a domain taxonomy of the predefined domain category, and (v) a natural language knowledge graph; and perform for each question of the one or more questions, using the plurality of responses received for each batch at a time: (a) determining one or more valid responses for each question, out of the plurality of responses pertaining to a current batch, using the domain taxonomy of the predefined domain category and the natural language knowledge graph; (b) applying a transformation decision criterion, for each question, using the associated one or more valid responses pertaining to the current batch, to determine (i) one or more transformable questions and (ii) one or more non-transformable questions, out of the one or more questions; (c) creating one or more quantitative response options, for each transformable question of the one or more transformable questions, using the associated one or more valid responses pertaining to the current batch; and (d) repeating the steps (a) through (c), for the a successive batch and for each of the one or more non-transformable questions, by considering (i) the successive batch as the current batch, (ii) the one or more non-transformable questions as the one or more questions, and (iii) the one or more valid responses pertaining to the current batch and the one or more valid responses pertaining to the successive batch together as the one or more valid responses pertaining to the current batch, for each non-transformable question, until one of (i) all of the one or more questions become transformable questions, or (ii) the number of the plurality of batches are completed, is met to transform the qualitative survey questionnaire into a quantitative survey questionnaire.

In yet another aspect, there are provided one or more non-transitory machine-readable information storage mediums comprising one or more instructions which when executed by one or more hardware processors cause: receiving (i) a qualitative survey questionnaire comprising one or more questions, wherein the qualitative survey questionnaire is associated with a predefined domain category (ii) a batch size defining a number of a plurality of batches, and a participant size defining a number of a plurality of participants present in each batch, (iii) a plurality of responses received for each question of the one or more questions, from the plurality of participants present in each batch, (iv) a domain taxonomy of the predefined domain category, and (v) a natural language knowledge graph; and performing for each question of the one or more questions, using the plurality of responses received for each batch at a time: (a) determining one or more valid responses for each question, out of the plurality of responses pertaining to a current batch, using the domain taxonomy of the predefined domain category and the natural language knowledge graph; (b) applying a transformation decision criterion, for each question, using the associated one or more valid responses pertaining to the current batch, to determine (i) one or more transformable questions and (ii) one or more non-transformable questions, out of the one or more questions; (c) creating one or more quantitative response options, for each transformable question of the one or more transformable questions, using the associated one or more valid responses pertaining to the current batch; and (d) repeating the steps (a) through (c), for the a successive batch and for each of the one or more non-transformable questions, by considering (i) the successive batch as the current batch, (ii) the one or more non-transformable questions as the one or more questions, and (iii) the one or more valid responses pertaining to the current batch and the one or more valid responses pertaining to the successive batch together as the one or more valid responses pertaining to the current batch, for each non-transformable question, until one of (i) all of the one or more questions become transformable questions, and (ii) the number of the plurality of batches are completed, is met to transform the qualitative survey questionnaire into a quantitative survey questionnaire.

In an embodiment, determining the one or more valid responses for each question, out of the plurality of responses pertaining to the current batch, using the domain taxonomy of the predefined domain category and the natural language knowledge graph, comprising: identifying one or more verbs and one or more aspects from a question, using a natural language processing technique; identifying one or more aspects from each response received for the question, using the natural language processing technique; determining an aspect sematic relation score for each response, based on (i) each of the one or more aspects identified from the question and (ii) each of the one or more aspects identified from the associated response, using the domain taxonomy of the predefined domain category; identifying one or more phrases related to one or more verbs identified from the question, from each response associated to the question, using the natural language knowledge graph; determining a verb-phrase sematic relation score for each response, based on each of the one or more phrases related to one or more verbs identified from the question, using the natural language knowledge graph; calculating a response length for each response, based on a number of characters present in the associated response; and determining the one or more valid responses for each question, out of the plurality of responses, based on (i) the aspect sematic relation score for the associated response, (ii) the verb-phrase sematic relation score for the associated response, and (iii) the response length for the associated response.

In an embodiment, applying the transformation decision criterion, for each question, using the associated one or more valid responses pertaining to the current batch, to determine (i) the one or more transformable questions and (ii) the one or more non-transformable questions out of the one or more questions, comprising: forming one or more synonymous phrase sets, for each question, from the associated one or more valid responses pertaining to the current batch, using the natural language knowledge graph, wherein each synonymous phrase set comprises one or more synonymous phrases present in the associated one or more valid responses; calculating a frequency of occurrence for each synonymous phrase set, based on a number of the one or more synonymous phrases present in the associated synonymous phrase set, for each question; identifying one or more synonymous phrase sets having the frequency of occurrence greater than or equal to a synonymous phrase frequency occurrence threshold, for each question; forming one or more aspect sets, for each question, from the associated one or more valid responses pertaining to the current batch, using the domain taxonomy based on a parent-child relationship, wherein each aspect set comprises one or more aspects present in the associated one or more valid responses; calculating a frequency of occurrence for each aspect set, based on a number of the one or more aspects present in the associated aspect set, for each question; identifying one or more aspect sets having the frequency of occurrence greater than or equal to an aspect frequency occurrence threshold, for each question; and determining (i) the one or more transformable questions and (ii) the one or more non-transformable questions, out of the one or more questions, by applying the transformation decision criterion for each question, wherein the transformation decision criterion comprises: (i) if the current batch is a first batch, then tag the one or more questions as the one or more non-transformable questions; and (ii) (a) if a difference in a variance of frequency of occurrence for each aspect set in the current batch and in a previous batch is less than a predefined first threshold, and (b) if the difference in the variance of frequency of occurrence for each synonymous phrase set in the current batch and in the previous batch, is less than a predefined second threshold, for the question, then add the associated question to the one or more transformable questions, otherwise add the associated question to the one or more non-transformable questions.

In an embodiment, creating the one or more quantitative response options, for each transformable question of the one or more transformable questions, using the associated one or more valid responses pertaining to the current batch, comprising: identifying a representative phrase for each of the one or more synonymous phrase sets having the frequency of occurrence greater than or equal to a synonymous phrase frequency occurrence threshold, based on (i) a higher frequency of occurrence of a synonymous phrase, (ii) a higher relevance index of each synonymous phrase with one or more verbs in the transformable question, (iii) the synonymous phrase having an equivalent distance from other synonymous phrases in the natural language knowledge graph; identifying a representative aspect for each of the one or more aspect sets having the frequency of occurrence greater than or equal to an aspect frequency occurrence threshold, based on a parent aspect; and creating the one or more quantitative response options, using the representative phrase for each of the one or more synonymous phrase sets and the representative aspect for each of the one or more aspect sets, with different combinations.

In an embodiment, creating the one or more quantitative response options, for each transformable question, further comprising adding 'others' as a quantitative response option for each transformable question, based on the number of the one or more quantitative response options created is less than a predefined quantitative response option value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 illustrates an exemplary flow diagram of a processor-implemented method for transforming qualitative survey into quantitative survey using domain knowledge and natural language processing, in accordance with some embodiments of the present disclosure.

FIG. 4 illustrates an exemplary flow diagram for determining the one or more valid responses for each question, out of the plurality of responses pertaining to the current batch, using the domain taxonomy of the predefined domain category and the natural language knowledge graph, in accordance with some embodiments of the present disclosure.

FIG. 5 illustrates an exemplary flow diagram for applying the transformation decision criterion, for each question, using the associated one or more valid responses pertaining to the current batch, to determine (i) the one or more transformable questions and (ii) the one or more non-transformable questions out of the one or more questions, in accordance with some embodiments of the present disclosure.

FIG. 6 illustrates an exemplary flow diagram for creating the one or more quantitative response options, for each transformable question of the one or more transformable questions, using the associated one or more valid responses pertaining to the current batch, in accordance with some embodiments of the present disclosure.

DETAILED DESCRIPTION

Figure 1:
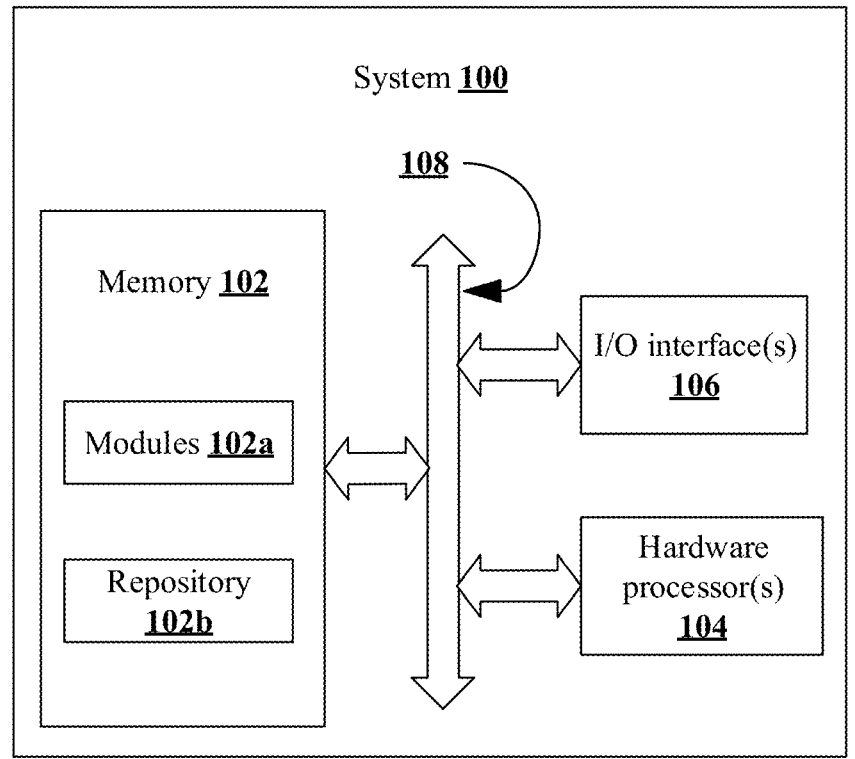
FIG. 1 is an exemplary block diagram of a system for transforming qualitative survey into quantitative survey using domain knowledge and natural language processing, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Design engineers design a qualitative survey questionnaire comprising one or more descripted type qualitative survey questions, where the users (people part of the survey) must provide the response to the qualitative survey questions in the descriptive manner during the survey. However, these user responses are generally in unstructured form and may not always be valid and relevant, and manual analysis of these user responses is troublesome task in the research studies. Hence, a quantitative survey questionnaire is an effective solution for the research studies instead of the troublesome qualitative survey questionnaire. The quantitative survey questionnaire comprising one or more multiple choice type qualitative survey questions with right options, where the users (people part of the survey) can easily choose these one or more options to provide the response. However, existing technologies that helps the design researchers to arrive at the right options for the quantitative survey questionnaire are very limited, inaccurate, and inefficient.

The present disclosure solves the technical problems in the art by transforming the qualitative survey questionnaire into the quantitative survey questionnaire using a domain knowledge and a natural language processing. The present disclosure enables the design researcher to minimize manual effort, conduct the exercise for large sample sizes using technological automation, consider the correct (contextual, relevant) options for quantitative questions, reduce researcher bias, and improve user data analysis.

Referring now to the drawings, and more particularly to FIG. 1 through FIG. 6, where similar reference characters denote associated features consistently throughout the figures, there are shown preferred embodiments and these embodiments are described in the context of the following exemplary systems and/or methods.

FIG. 1 is an exemplary block diagram of a system 100 for transforming qualitative survey into quantitative survey using domain knowledge and natural language processing, in accordance with some embodiments of the present disclosure. In an embodiment, the system 100 includes or is otherwise in communication with one or more hardware processors 104, communication interface device(s) or input/ output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2:
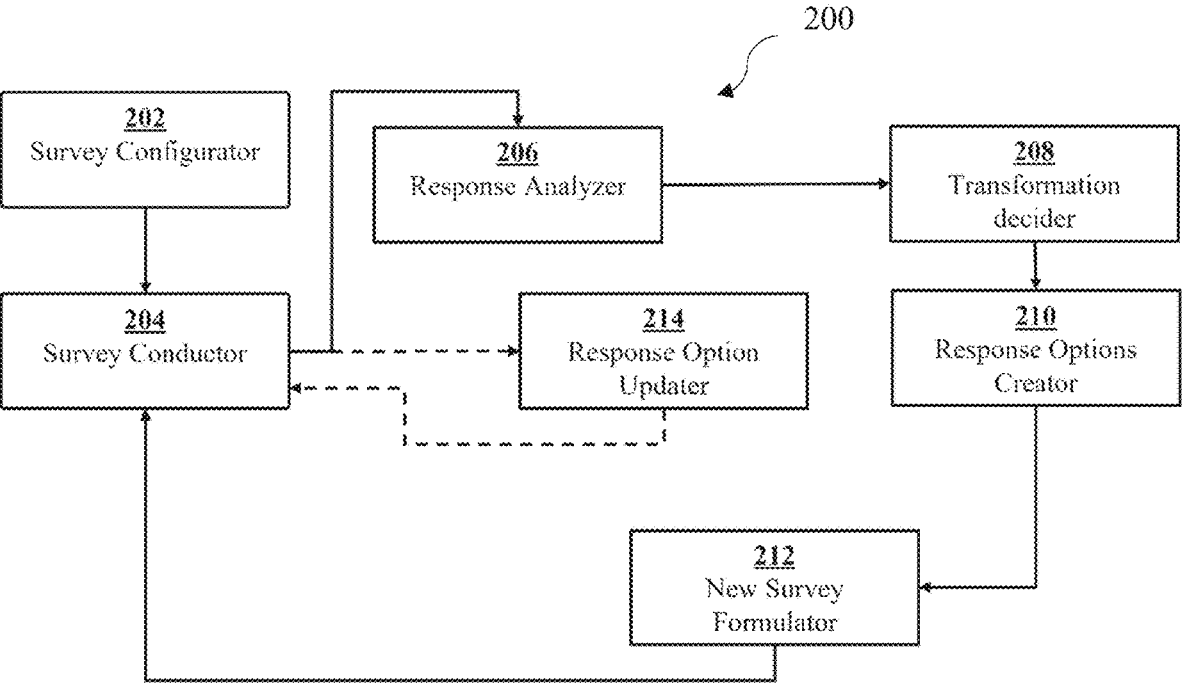
FIG. 2 is an exemplary block diagram illustrating modules of the system of FIG. 1 for transforming qualitative survey into quantitative survey using domain knowledge and natural language processing, in accordance with some embodiments of the present disclosure.

Referring collectively to FIG. 2 and FIG. 3, components and functionalities of the system 100 are described in accordance with an example embodiment of the present disclosure. For example, FIG. 2 is an exemplary block diagram illustrating modules 200 of the system 100 of FIG. 1 for transforming qualitative survey into quantitative survey using domain knowledge and natural language processing, in accordance with some embodiments of the present disclosure. As shown in FIG. 2, the modules include a survey configurator 202, a survey conductor 204, a response analyzer 206, a transformation decider 208, a response options creator 210, a new survey formulator 212, and a response options updater 214.

In an embodiment, the survey configurator 202 configures an initial qualitative survey questionnaire having one or more qualitative questions, a number of batches, and a number of participants in each batch the survey to be conducted. The survey conductor 204 conducts the initial qualitative survey questionnaire for the first batch and an updated qualitative survey questionnaire in the subsequent batches one after the other and collects the responses from the participants present in each batch. The response analyzer 206 determine one or more valid responses out of all the responses for a given batch and the transformation decider 208 decides whether the qualitative survey question can be transformed into a quantitative survey question or not based on the one or more valid responses received so far in the current batch.

The response options creator 210 creates the one or more response options using the valid responses by which the qualitative survey question can be transformed into the quantitative survey question decided by the transformation decider 208. The new survey formulator 212 formulates the subsequent survey only for the qualitative survey questions identified as non-transformable questions and enables the survey conductor 204 to conduct the qualitative survey questionnaire with only the questions remained as non-transformable and collect the responses from the next of participants, and so on, so the modules of the system 100 ensures that all the qualitative survey questions becomes the quantitative survey questions so as to transform the qualitative survey questionnaire into the quantitative survey questionnaire.

The response options updater 214 updates the quantitative survey question with one or more customized response options when the number of response options created by the response options creator 210 is less than a predefined total response options, for example 7. In an embodiment, the modules 200 are stored in the repository 102*b* of the system 100.

Referring to FIG. 3, components and functionalities of the system 100 are described in accordance with an example embodiment of the present disclosure. For example, FIG. 3 illustrates an exemplary flow diagram of a processor-implemented method 300 for transforming qualitative survey into quantitative survey using domain knowledge and natural language processing, in accordance with some embodiments of the present disclosure. Although steps of the method 300 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to receive (i) a qualitative survey questionnaire (ii) a batch size, and a participant size, (iii) a plurality of responses, (iv) a domain taxonomy, and (v) a natural language knowledge graph. In an embodiment, the qualitative survey questionnaire is associated with a predefined domain category for which the research study is to be conducted by the researchers for evaluation and analysis of user opinions. For example, some predefined domain categories including but are not limited to health, social behavior, psychology, and education.

The qualitative survey questionnaire comprises one or more questions of type qualitative or in other words descriptive, which are to be transformed into the quantitative survey questionnaire. The resultant quantitative survey questionnaire comprises same questions in the qualitative survey questionnaire, but of type objective with multiple options in nature.

In an embodiment, the qualitative survey questionnaire is conducted with various demographic segments so that the responses received in the qualitative survey questionnaire and the response options created in the quantitative survey questionnaire are universal.

The batch size indicates a number of a plurality of batches and the participant size defines a number of a plurality of participants present in each batch among which the survey is conducted with the qualitative survey questionnaire. For example, the batch size may be 10 batches and the participants size may be 100 participants in each batch. The plurality of responses are the descriptive responses received for each question of the one or more questions, from the plurality of participants present in each batch. The domain taxonomy corresponds a domain knowledge of the predefined domain category and comprises the domain knowledge in hierarchical order. The natural language knowledge graph is a knowledge graph of English based natural language. An exemplary natural language knowledge graph is WordNet.

In an embodiment, the survey configurator 202 is configured to receive the qualitative survey questionnaire of the predefined domain category, the number of batches, the number of participants in each batch, the domain taxonomy, and the natural language knowledge graph. The survey conductor 204 is configured to receive collect the plurality of responses for each question from the participants present in each batch.

An exemplary qualitative question along with three exemplary responses received from three participants of a single batch are provided to further explain the remaining steps of the method 300.

Exemplary qualitative question: How do you position physical wellbeing in your life? - - -

Exemplary Response1: Important but not frequent. Have spurts where I start for my physical wellbeing but unable to carry out the plan for long. But am conscious and take some efforts in getting sufficient physical activity and proper diet/nutrition #Sometimes.

Exemplary Response2: Physical well-being is very crucial in life because unless you are fit, you will not able to do the family as well as other activities.

Exemplary Response3: Physical wellbeing is always a priority in my life. Well, if not always, most of the time it's back in my head even if I am not able to follow any regular physical activities or diet as such #ExpectationVsReality. Considering the current situation, physical wellbeing has tremendously changed its meaning in my life for good and bad for last few months. For me until now, physical wellbeing is mostly a struggle within myself, say right from planning to exercise.

At step 304 of the method 300, the one or more hardware processors 104 of the system 100 are configured to perform the steps 304*a* through 304*d* for each question of the one or more questions, using the plurality of responses received for each batch at a time, until one of (i) all of the one or more questions become transformable questions, and (ii) the number of the plurality of batches are completed, is met to transform the qualitative survey questionnaire into the quantitative survey questionnaire. The steps 304*a* through 304*d* are performed for the plurality of responses received for each question from each batch at a time. More specifically, steps 304*a* through 304*c* are performed for the plurality of responses received for each question from the first batch and in the subsequent batches, the plurality of responses to the questions that are not transformed are only considered, and the steps 304*a* through 304*c* are repeated, and so on to transform the qualitative survey questionnaire into the quantitative survey questionnaire.

Now, performing the steps 304*a* through 304*d* is explained below in detail. At step 304*a*, one or more valid responses out of the plurality of responses are determined for each question. The plurality of responses pertaining to a current batch (also considered as a first batch for the first iteration) are considered at this step. The domain taxonomy of the predefined domain category and the natural language knowledge graph are used in this step to determine the one or more valid responses out of the plurality of responses, for each question, based on their semantic relevance. The response analyzer 206 is configured to determine the one or more valid responses out of the plurality of responses for each question.

FIG. 4 illustrates an exemplary flow diagram for determining the one or more valid responses for each question, out of the plurality of responses pertaining to the current batch, using the domain taxonomy of the predefined domain category and the natural language knowledge graph, in accordance with some embodiments of the present disclosure. As shown in FIG. 4, determining the one or more valid responses for each question, out of the plurality of responses pertaining to the current batch are further explained through steps 304*a*1 through 304*a*7.

First at step 304a1, one or more verbs and one or more aspects are identified from a question (for each question of the plurality of questions), using a natural language processing (NLP) technique and grammar rules. Here the one or more verbs refer to the English natural language verbs and the one or more aspects refer to entities, concepts, or phrases those associated to the subject or issue of the domain category that respondents mention and evaluate. The one or more aspects are identified using an aspect extraction technique which involves a part-of-speech (POS) tagging and dependency parsing based on the NLP technique, which is used to identify nouns or noun phrases that are likely to be the aspects.

From the exemplary qualitative question mentioned at step 302 of the method 300 one verb and one aspect are observed as mentioned below:

Exemplary qualitative question: How do you position physical wellbeing in your life? - - -

Verb: position

Aspect: physical wellbeing

At step 304a2, one or more aspects are identified from each response of the plurality of responses received for the question (each question), using the NLP technique. The one or more aspects refer to the same definition as explained at step 304a1 and are extracted aspect extraction technique as explained at step 304a1.

Below are the identified aspects from the exemplary response1 mentioned at step 302 of the method 200:

Exemplary Response1: Important but not frequent. Have spurts where I for my physical wellbeing start but unable to carry out the plan for long. But am conscious and take some efforts in getting sufficient physical activity and proper diet/nutrition #Sometimes.

Aspects: physical activity, diet/nutrition, physical wellbeing

At step 304a3, an aspect sematic relation score for each response, is determined based on each of the one or more aspects identified from the question (q) at step 304a1 and each of the one or more aspects identified from the associated response at step 304a2. The domain taxonomy of the predefined domain category is used at this step to determine the aspect sematic relation score for each response.

In an embodiment, the aspect sematic relation score for each response is calculated using equation 1:

$$\text{SemRelScore\_aspect} = \text{relevance index of } q\_aspect_1 \text{ to } r\_aspect_1 + \quad (1)$$
$$\text{relevance index of } q\_aspect_1 \text{ to } r\_aspect_2 + \ldots +$$
$$\text{relevance index of } q\_aspect_1 \text{ to } r\_aspect_n + \ldots +$$
$$\text{relevance index of } q\_aspect_n \text{ to } r\_aspect_1 +$$
$$\text{relevance index of } q\_aspect_n \text{ to } r\_aspect_2 + \ldots +$$
$$\text{relevance index of } q\_aspect_n \text{ to } r\_aspect_n$$

Whereas the relevance index value may vary anywhere between 0 and 1, where 1 being highly relevant and 0 being not at all relevant.

From the identified aspect (physical wellbeing) from the exemplary qualitative question and the identified aspects from the exemplary response1 (physical activity, diet/nutrition, physical wellbeing) mentioned at step 304a1 and at step 304a2, the aspect sematic relation score is calculated using equation 2:

$$\text{SemRelScore\_aspect} = \quad (2)$$
$$\text{relevance index of } physicalwellbeing \text{ to physcal activity} +$$
$$\text{relevance index of } physicalwellbeing \text{ to diet/nutrition} +$$
$$\text{relevance index of } physicalwellbeing \text{ to } pyhysicalwellbeing$$

And the SemRelScore_aspect=0.9+0.9+1=2.9

At step 304a4, one or more phrases related to one or more verbs identified from the question at step 304a1 are identified from each response associated to the question. The natural language knowledge graph is utilized at this step to identify the one or more phrases related to one or more verbs identified from the question. Relevance index of the verb to each phrase is calculated based on the distance between the verb node and the phrase (word) node in the natural language knowledge graph. The shorter the distance the more the relevance is.

In the given example,

Verb from the question: position

Related phrases from the exemplary response1: Important, not frequent, spurts, unable to carry out the plan for long, conscious, take some efforts, sufficient, proper A total number of relevant phrases found in each response can be calculated using equation 3:

$$\text{TotalRelVerbPhrases} = \text{Number of phrases related to } q\_verb_1 + \quad (3)$$
$$\text{Number of phrases related to } q\_verb_2 + \ldots +$$
$$\text{Number of phrases related to } q\_verb_n$$

At step 304a5, a verb-phrase sematic relation score for each response, is determined based on each of the one or more phrases related to one or more verbs identified from the question at step 304a4. The natural language knowledge graph is used in this step to determine the verb-phrase sematic relation score for each response. At step 304a6, a response length for each response is calculated. The response length for each response is equal to the number of characters present in the associated response.

In an embodiment, the verb-phrase sematic relation score for each response is calculated using equation 4:

$$\text{SemRelScore\_VerbPhrase} + \text{TotalRelVerbPhrases} + \quad (4)$$
$$(\text{relevance index of } q\_verb_1 \text{ to } r\_phrase_1 +$$
$$\text{relevance index of } q\_verb_1 \text{ to } r\_phrase_2 + \ldots +$$
$$\text{relevance index of } q\_verb_1 \text{ to } r\_phrase_n + \ldots +$$
$$\text{relevance index of } q\_verb_n \text{ to } r\_phrase_1 +$$
$$\text{relevance index of } q\_verb_n \text{ to } r\_phrase_2 + \ldots +$$
$$\text{relevance index of } q\_verb_n \text{ to } r\_phrase_n$$

Wherein the relevance index in this also vary between 0 and 1, 1 being highly relevant and o being not at all relevant.

In the given example,

TotalRelVerbPhrases=Number of phrases related to position (verb)=8

And the equation for calculating the verb-phrase sematic relation score for each response is mathematically expressed as in equation 5:

$$\text{SemRelScore\_VerbPhrase} = \text{TotalRelVerbPhrases} + \quad (5)$$

(relevance index of position to important + relevance index of position to not frequent + relevance index of position to spurts + relevance index of position to unable to carryout the plan for long + relevance index of position to take some efforts + relevance index of position to sufficient + relevance index of position to proper $$\text{SemRelScore}_{VerbPhrase} = 8 =$$

$$(0.9 + 0.3 + 0.3 + 0.3 + 0.2 + 0.5 + 0.4 + 0.4 = 11.3$$

At step 304a7, the one or more valid responses for each question, are determined out of the plurality of responses, based on (i) the aspect sematic relation score for the associated response determined at step 304a3, (ii) the verb-phrase sematic relation score for the associated response determined at step 304a5, and (iii) the response length for the associated response calculated at step 304a6. More specifically, the one or more valid responses out of the plurality of responses for each question are determined as explained below:

In an embodiment, the response length for each response is sub-categorized into low, medium, and high, as below:

Low, if the length of the response=<25 characters.

Medium, if the length of the response=25 to 80 characters.

High, if the length of the response=>80 characters

In an embodiment, the aspect sematic relation score for each response is sub-categorized into low, medium, and high, as below:

Low, if aspect sematic relation score of the response=<1.

Medium, if aspect sematic relation score of the response=1 to 5.

High, if aspect sematic relation score of the response=>5

In an embodiment, the verb-phrase sematic relation score for each response is sub-categorized into low, medium, and high, as below:

Low, if SemRelScore_VerbPhrase<2.5 or none of the relevance index of q_verb to r_phrase>0.4.

Medium, if SemRelScore_VerbPhrase=2.5 to 8 and at least one of the relevance index of q_verb to r_phrase>0.4.

High, if SemRelScore_VerbPhrase>8 and more than one of the relevance index of q_verb to r_phrase>0.4

Then, the validity of reach response based on the sub-categorization of the response length, the aspect sematic relation score, and the verb-phrase sematic relation score is determined using the following exemplary Table 1:

TABLE 1

| Length | SemRelScore_Aspects | SemRelScore_VerbPhrase | Response Valid |
|---|---|---|---|
| Low | Low | Low | No |
| Low | Low | Medium | No |
| Low | Low | High | No |
| Low | Medium | Low | No |
| Low | High | Low | No |
| Low | Medium | Medium | Yes |
| Low | High | Medium | Yes |
| Low | Medium | High | Yes |

TABLE 1-continued

| Length | SemRelScore_Aspects | SemRelScore_VerbPhrase | Response Valid |
|---|---|---|---|
| Low | High | High | Yes |
| Medium | Low | Low | No |
| Medium | Low | Medium | No |
| Medium | Low | High | Yes |
| Medium | Medium | Low | No |
| Medium | High | Low | No |
| Medium | Medium | Medium | Yes |
| Medium | High | Medium | Yes |
| Medium | Medium | High | Yes |
| Medium | High | High | Yes |
| High | Low | Low | No |
| High | Low | Medium | No |
| High | Low | High | No |
| High | Medium | Low | No |
| High | High | Low | No |
| High | Medium | Medium | Yes |
| High | High | Medium | Yes |
| High | Medium | High | Yes |
| High | High | High | Yes |

From Table 1,

No—are the invalid responses that need to be ignored.

Yes—the valid responses to be considered for creating options

It is determined that all the three exemplary responses (1, 2, and 3), are the valid responses and are hence processed with further steps.

At step 304b, a transformation decision criterion, for each question, using the associated one or more valid responses determined at step 304a, pertaining to the current batch. The transformation decision criterion helps to determine (i) one or more transformable questions and (ii) one or more non-transformable questions, out of the one or more questions. The one or more transformable questions are the questions (of the plurality of questions received at step 302) those are transformable as the quantitative survey questions given the valid responses pertaining to the current batch. Similarly, one or more non-transformable questions (of the plurality of questions received at step 302) are the questions those are non-transformable as the quantitative survey questions given the valid responses pertaining to the current batch. The transformation decider 208 is configured to determine (i) one or more transformable questions and (ii) one or more non-transformable questions, out of the one or more questions, using the transformation decision criterion.

FIG. 5 illustrates an exemplary flow diagram for applying the transformation decision criterion, for each question, using the associated one or more valid responses pertaining to the current batch, to determine (i) the one or more transformable questions and (ii) the one or more non-transformable questions out of the one or more questions, in accordance with some embodiments of the present disclosure. As shown in FIG. 5, determining (i) the one or more transformable questions and (ii) the one or more non-transformable questions out of the one or more questions by applying the transformation decision criterion, for each question, using the associated one or more valid responses pertaining to the current batch, is further explained below steps 304b1 through 304b7.

At step 304b1, one or more synonymous phrase sets, are formed for each question, from the associated one or more valid responses (from all valid responses) determined at step 304a pertaining to the current batch. Each synonymous phrase set includes one or more synonymous phrases present in the associated one or more valid responses. The natural language knowledge graph is employed in this step to determine the synonymous phrases present in the associated one or more valid responses. There may be at least one synonymous phrase sets from the single valid response. Firstly, each phrase present in the valid response is taken as a reference and secondly, other phrases synonymous are identified using the natural language knowledge graph, and those are formed as one synonymous phrase set. Note here that, the one or more synonymous phrase sets are so unique that the phrase or the synonymous phrases is not present in more than one synonymous phrase sets.

At step 304b2, a frequency of occurrence for each synonymous phrase set formed at step 304b1 is calculated based on the number of the one or more synonymous phrases present in the associated synonymous phrase set, for each question.

At step 304b3, the one or more synonymous phrase sets having the frequency of occurrence greater than or equal to a synonymous phrase frequency occurrence threshold, are identified from the one or more synonymous phrase sets formed at step 304b1, for each question. In an embodiment, the synonymous phrase frequency occurrence threshold depends on the number of the batches and the number of the valid responses present in each batch.

From all the three valid exemplary responses, six synonymous phrase sets can be formed as:

{important—1, crucial—1, always a priority—1, mostly back in my head—1}

So, the total frequency of this synonymous phrase set is 1+1+1+1=4

Similarly, For

{not frequent—1, spurts—1, unable to carry out the plan for long—1, unable to follow—1} the total frequency of this synonymous phrase set is 1+1+1+1=4

The remaining synonymous phrase sets formed are as below:

{Conscious—1}
{take some efforts—1}
{sufficient—1}
{proper—1}

However, only the first two synonymous phrase sets having the frequency of occurrence greater than or equal to the synonymous phrase frequency occurrence threshold and thus are considered for further processing and rest of the synonymous phrase sets (third, fourth, fifth, and sixth) have total frequency 1, so are left aside At step 304b4, one or more aspect sets are formed for each question, from the associated one or more valid responses (from all valid responses) pertaining to the current batch, using the domain taxonomy based on a parent-child relationship (hierarchical relationship present in the domain taxonomy). Each aspect set comprises one or more aspects present in the associated one or more valid responses.

At step 304b5, a frequency of occurrence for each aspect set formed at step 304b3, is calculated based on the number of the one or more aspects present in the associated aspect set, for each question. At step 304b6, one or more aspect sets having the frequency of occurrence greater than or equal to an aspect frequency occurrence threshold, for each question. In an embodiment, the aspect frequency occurrence threshold depends on the number of the batches and the number of the valid responses present in each batch.

From the domain taxonomy, all the direct parent-child nodes if any in each aspect set are identified using the parent child relationship. For example, if in set of identified aspects of all the three exemplary valid responses, there are aspects like "trekking", "cycling", "walking" etc. These all are the direct children of "physical activity" aspect. Hence, they all can be part of one aspect set (one cluster)

{physical activity—2, trekking—1, cycling—1, walking—1}=5, where 5 is the total frequency of occurrence for this aspect set.

However, there is no direct parent-child relationship among the identified aspects from all the three exemplary valid responses, and hence the clusters formed are as below:

{physical wellbeing—2}
{physical activity—2}
{diet—2}

At step 304b7, (i) the one or more transformable questions and (ii) the one or more non-transformable questions, are determined out of the one or more questions. The transformation (conversion) decision criterion is applied for each question, to classify into one of the transformable questions, and the non-transformable questions. The one or more transformable questions are the questions (of the plurality of questions received at step 302) those are transformable as the qualitative survey questions given the valid responses pertaining to the current batch. Similarly, one or more non-transformable questions (of the plurality of questions received at step 302) are the questions those are non-transformable as the quantitative survey questions given the valid responses pertaining to the current batch.

The transformation decision criterion includes two criteria, i.e., a first criteria and a second criteria. Both the first criteria and the second criteria are to be satisfied to classify the questions into one of the transformable questions, and the non-transformable questions. The first criteria are: if the current batch is a first batch (the batch utilized in the first iteration), then tag the one or more questions as the one or more non-transformable questions. That means the questions with the valid responses pertaining to the first batch are non-transformable questions. The second criteria is a comparison criteria with reference to the valid responses pertaining to the previous batch and the current batch. If the current batch is the first batch, then the second criteria is not applicable.

As there are no transformable questions using the valid response pertaining to the first batch, the step 304c is also not applicable and the step 304b is executed for repeating the steps 304a through 304c for the valid responses received from the subsequent batch (i.e., the second batch or next batch). In the second batch, the second criteria of the transformation decision criterion are applicable. The second criteria again comprise two sub-criteria namely a first sub-criteria and a second sub-criteria. The first sub-criteria are if a difference between a variance of frequency of occurrence for each aspect set (of the one or more aspect sets formed at step 304b4) in the current batch (for example, the second batch) and in a previous batch (for example, first batch) is less than a predefined first threshold.

In an embodiment, the predefined first threshold is decided dynamically by the system 100 for every batch, based on the below factors but are not limited to—

Number of batches completed (if more number of batches are done and the variance in frequencies across batches is not much, then there is a possibility of considering it for the transformation)

Number of batches remaining (if less and the variance has not been increasing much in the previous batches, then can consider for the transformation).

The variance in batch N and N−1 are equal (then there is a possibility of considering it for the transformation).

The coverage of the demographics till current batch and increase in the coverage of the demographics of batch N as compared to that of N−1 (e.g., if the coverage increases from batch N−1 to N and variance of batch N and N−1, increases in proportion and the coverage of demographics is almost full, then there is a possibility of considering it for the transformation)

The second sub-criteria are if the difference in the variance of frequency of occurrence for each synonymous phrase set (of the one or more synonymous phrase sets formed at step 304$b$1) in the current batch (for example, the second batch) and in a previous batch (for example, the first batch), is less than a predefined second threshold, for the question. In an embodiment, the predefined second threshold is decided dynamically by the system 100 for every batch, based on the below factors—

Number of batches completed (if more number of batches are done and the variance in frequencies across batches is not much, then there is a possibility of considering it for the transformation).

Number of batches remaining (if less and the variance has not been increasing much in the previous batches, then there is a possibility of considering it for the transformation).

The variance in batch N and N−1 are equal (then there is a possibility of considering it for the transformation).

The coverage of the demographics till current batch and increase in the coverage of the demographics of batch N as compared to that of N−1 (e.g., if the coverage increases from batch N to N−1 and variance of batch N and N−1, increases in proportion and the coverage of demographics is almost full, then there is a possibility of considering it for the transformation)

When both the sub-criteria of the second criteria are satisfied, then the associated question is tagged (added) to the one or more transformable questions. Otherwise, the associated question is tagged (added) to the one or more non-transformable questions. The main logic present in this step 304$b$7 is that if the associated valid responses received from a particular batch are able to transform the question from qualitative to quantitative, then only such questions are marked as the transformable questions.

In the exemplary question and all the three valid responses in the current batch, the variance in the frequency of occurrence of the identified aspects are calculated in the percentile form:
For example, for below aspects,
{physical wellbeing—2}
{physical activity—2}
{diet—2}

The frequency of occurrence {2, 2, 2} of these aspects in the percentile form will be {100, 100, 100}. The variance in these frequency of occurrence in the first batch is 0. In an embodiment, the variance is calculated using standard way of calculating the variance.

Similarly, the variance in the frequency of occurrence of identified phrases is also calculated in the percentile form. If the difference in the variance of the frequencies of occurrence of phrases in batch 'N' and batch 'N−1' (say diff_var_phrases) is less than the predefined first threshold and the diff_var_aspects is less than the predefined second threshold, consider the question for transformation (conversion) into the quantitative question. Otherwise, do not convert the question to quantitative one in this batch 'N'. The conversion decision will be re-evaluated in batch N+1.

At step 304$c$, one or more quantitative response options, are created for each transformable question of the one or more transformable questions obtained at step 304$b$, using the associated one or more valid responses pertaining to the current batch. The response options creator 210 is configured to create the one or more quantitative response options for each transformable question using the associated one or more valid responses pertaining to the current batch.

FIG. 6 illustrates an exemplary flow diagram for creating the one or more quantitative response options, for each transformable question of the one or more transformable questions, using the associated one or more valid responses pertaining to the current batch, in accordance with some embodiments of the present disclosure. As shown in FIG. 6, creating the one or more quantitative response options for each transformable question is further explained through steps 304$c$1 through 304$c$3.

At step 304$c$1, a representative phrase for each of the one or more synonymous phrase sets having the frequency of occurrence greater than or equal to the synonymous phrase frequency occurrence threshold obtained at step 304$b$3, is identified. The representative phrase for each of the one or more synonymous phrase sets, is identified based on (i) a higher frequency of occurrence of a synonymous phrase in the associated synonymous phrase set, (ii) a higher relevance index of each synonymous phrase with one or more verbs in the transformable question identified at step 304$b$7, (iii) the synonymous phrase having an equivalent distance from other synonymous phrases in the associated synonymous phrase set in the natural language knowledge graph.

The system 100 is configured to calculate the representative phrase for each of the one or more synonymous phrase sets having the frequency of occurrence greater than or equal to the synonymous phrase frequency occurrence threshold.

For the below exemplary synonymous phrase sets,
{important, crucial, always a priority, mostly back in my head}—4=important
And {not frequent, spurts, unable to carry out the plan for long, unable to follow}—4=not able to follow At step 304$c$2, a representative aspect for each of the one or more aspect sets having the frequency of occurrence greater than or equal to an aspect frequency occurrence threshold obtained at step 304$b$6, is identified, based on a parent aspect in the natural language knowledge graph.

From each higher frequency of occurrence of aspect set that has multiple aspects in the set, the most representative option is the parent of the other child nodes in the set.

For example, if the aspect set is {physical activity—2, trekking—1, cycling—1, walking—1}=5, where 5 is the total frequency of this cluster of aspects, physical activity being the parent of all these children, "physical activity" will be considered as the most representative aspect of the cluster that can be used in the next step to create response options. However, in the example mentioned at step 302 (the running example), there are no aspect sets with multiple aspects in it, hence this step is not applicable.

At step 304$c$3, the one or more quantitative response options, are created for each transformable question, using the representative phrase for each of the one or more synonymous phrase sets identified at step 304$c$1 and the representative aspect for each of the one or more aspect sets identified at step 304$c$2, with different combinations. More specifically, the one or more quantitative response options, are created for each transformable question using the representative phrases and the representative aspects obtained from the previous steps.

Further, (i) when the number of the one or more quantitative response options created at this step is less than a predefined quantitative response option value, or (ii) the plurality of responses not yet covered intended demographic segments, then a customizable quantitative response option such as 'others' is added for each such transformable question. In an embodiment, an exemplary predefined quantitative response option value is 7. The response options updater 214 is configured to add the additional response option as others at this step.

The exemplary qualitative question mentioned at step 302 is transformed into the quantitative question with the response options as follows: How do you position physical wellbeing in your life?

Important physical activity

Important diet

Important physical wellbeing

Not able to follow physical activity

Not able to follow diet

Not able to follow physical wellbeing

Other _____

For all the other phrases or aspects that were ignored due to low frequency, the option "Other" is added—

If in this batch of responses, all the variation in respondent demographics is not yet covered. In this case, consider refining this question's options in the next batch as well.

Or if in this batch of responses, there are fewer than 7 options are created.

In all other cases, i.e., when there are more than 7 options created, all the variation in demographics is also covered, finalize the question and answers in this batch only and just analyze others in the next batch.

Moreover, while finalizing the response options:

The higher frequency phrases and aspects are given more importance. Depending on the number of unique phrases and their frequencies, a threshold frequency is decided, so that only phrases having equal or higher frequency than threshold frequency are considered as options and all others are put under the bucket of "Other".

With above step, if there are more than 7 (threshold) options getting created, there is a need to merge some of the options. All the options are again run through the similarity check algorithm (based on wordnet like knowledge graphs and domain taxonomy using graph processing technique), if two of the options are more related to each other than others, those two options are combined into one set to identify a most appropriate option from that set.

In an embodiment, the quantitative questions that have the right options as 'others' may be considered as a qualitative question and is considered for the next batch to receive the responses.

Finally at step 304*d*, the steps 304*a* through 304*c* are repeated only when there are one or more non-transformable questions at step 304*c*, using the valid responses received pertaining to that successive batch (subsequent batch). In this step of 304*d*, the successive batch is considered as the current batch. The one or more non-transformable questions are considered as the one or more questions. The one or more valid responses pertaining to the current batch and the one or more valid responses pertaining to the successive batch together are considered as the one or more valid responses pertaining to the current batch, for each non-transformable question.

The step of 304*d* is performed until one of (i) all of the one or more questions become the transformable questions, and (ii) the number of the plurality of batches are completed, is met. Once all the transformable questions are identified from the one or more questions and once the one or more quantitative response options are created for each transformable question, the qualitative survey questionnaire received at step 302 becomes the quantitative survey questionnaire. Thus, the qualitative survey questionnaire comprising one or more questions is transformed into the quantitative survey questionnaire with the one or more quantitative response options for each question.

The method 300 is performed in two implementations namely, a first implementation and a second implementation, when the responses to each batch of participants are considered. In the first implementation, if the responses to each question in the qualitative survey questionnaire are available for multiple batches, then the steps 304*a* through 304*d* are repeated one batch after the other without any interruption, until one of (i) all of the one or more questions become the transformable questions, and (ii) the number of the plurality of batches are completed, is met. In the second implementation, if the responses to each question in the qualitative survey questionnaire are available only for two batches (the first batch and the second batch), then first the steps 304*a* through 304*d* are performed for those two batches. If any non-transformable questions left, then only such non-transformable questions left are conducted for survey for the subsequent batch, and so on until all of the one or more questions become the transformable questions. The new survey formulator 212 is configured to receive the responses for the subsequent batches only for the non-transformable questions.

Hence the methods and systems of the present disclosure dynamically transform the qualitative survey questionnaire to the quantitative survey questionnaire effectively. The methods and systems of the present disclosure does not require any manual analysis of these user responses which is so troublesome task and interpretation is extremely easy especially in case of huge number of responses. The methods and methods and systems of the present disclosure utilizes the domain knowledge and the natural language knowledge graph for transforming the qualitative survey questionnaire to the quantitative survey questionnaire, to create the right options and hence are accurate, efficient.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of transforming the qualitative survey questionnaire into the quantitative survey questionnaire using the domain knowledge and the natural language processing. The present disclosure enables the design researcher to minimize manual effort, conduct the exercise for large sample sizes using technological automation, consider the correct (contextual, relevant) options for quantitative questions, reduce researcher bias, and improve user data analysis.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising the steps of:

receiving, via one or more hardware processors, (i) a qualitative survey questionnaire comprising one or more questions, wherein the qualitative survey questionnaire is associated with a predefined domain category (ii) a batch size defining a number of a plurality of batches, and a participant size defining a number of a plurality of participants present in each batch, (iii) a plurality of responses received for each question of the one or more questions, from the plurality of participants present in each batch, (iv) a domain taxonomy of the predefined domain category, wherein the domain taxonomy comprises a domain knowledge in an hierarchical order, and (v) a natural language knowledge graph, wherein the natural language knowledge graph is a knowledge graph of english based natural language; and performing, via the one or more hardware processors, for each question of the one or more questions, using the plurality of responses received for each batch at a time:

(a) determining one or more valid responses for each question, out of the plurality of responses pertaining to a current batch, using the domain taxonomy of the predefined domain category and the natural language knowledge graph based on their semantic relevance, wherein determining the one or more valid responses for each question, out of the plurality of responses pertaining to the current batch, using the domain taxonomy of the predefined domain category and the natural language knowledge graph, comprising:

identifying one or more verbs and one or more aspects from a question, using a natural language processing (NLP) technique and a grammar rule, wherein the identification of the one or more aspects comprises:

applying an aspect extraction technique including a part-of-speech (POS) tagging and a dependency parsing based on the NLP technique; and determining nouns or noun phrases to represent the aspect;

identifying one or more aspects from each response received for the question, using the NLP technique;

determining an aspect sematic relation score for each response, based on (i) each of the one or more aspects identified from the question and (ii) each of the one or more aspects identified from the associated response, using the domain taxonomy of the predefined domain category, wherein the aspect semantic relation score is computed according to $$SemRelScore_{aspect} = \sum_{i=1}^{n} \sum_{j=1}^{n} RelIndex(q_{aspect_i}, r_{aspect_j}) \quad (1)$$

where, $q_{aspect_i}$ represents the i-th aspect identified from the question;

$r_{aspect_j}$ represents the j-th aspect identified from the response;

RelIndex($q_{aspect_i}$, $r_{aspect_j}$) denotes a relevance index value between 0 and 1, where 1 indicates high relevance and 0 indicates no relevance;

identifying one or more phrases related to one or more verbs identified from the question, from each response associated to the question, using the natural language knowledge graph, wherein total number of relevant verb phrases in each response is calculated according to $$TotalRelVerbPhrases \sum_{i=1}^{n} = \text{Count}(\text{phrases related to } q_{verb_i}) \quad (2)$$

where:

$q_{verb_i}$ represents the i-th verb identified from the question; and

Count($\cdot$) denotes the number of phrases in the response that are semantically related to the corresponding verb;

determining a verb-phrase sematic relation score for each response, based on each of the one or more phrases related to one or more verbs identified from the question, using the natural language knowledge graph, wherein the verb-phrase semantic relation score for each response is calculated according to $$SemRelScore_{VerbPhrase} = \qquad (3)$$
$$TotalRelVerbPhrases \sum_{i=1}^{m} \sum_{j=1}^{m} RelIndex(q_{verb_i}, r_{phrase_j})$$

where:

TotalRelVerbPhrases represents the total number of phrases in the response that are related to the verbs in the question;

$q_{verb_i}$ represents the i-th verb identified from the question;

$r_{phrase_j}$ represents the j-th phrase identified from the response; and

RelIndex($q_{verb_i}$, $r_{phrase_j}$) denotes a relevance index value ranging from 0 to 1, where 1 indicates high relevance and 0 indicates no relevance;

calculating a response length for each response, based on a number of characters present in the associated response; and determining the one or more valid responses for each question, out of the plurality of responses, based on (i) the aspect sematic relation score for the associated response, wherein the aspect semantic relation score for each response is categorized into one of a plurality of predefined categories comprising low, medium, and high, based on threshold values, (ii) the verb-phrase sematic relation score for the associated response, wherein the verb-phrase semantic relation score for each response is categorized into one of a plurality of predefined categories comprising low, medium, and high, based on threshold values, and (iii) the response length for the associated response, wherein the length of each response is categorized into one of a plurality of predefined categories comprising low, medium, and high, based on threshold values;

(b) applying a transformation decision criterion, for each question, using the associated one or more valid responses pertaining to the current batch, to determine (i) one or more transformable questions and (ii) one or more non-transformable questions, out of the one or more questions;

(c) creating one or more quantitative response options, for each transformable question of the one or more transformable questions, using the associated one or more valid responses pertaining to the current batch;

(d) updating the quantitative survey question with one or more customized response options when number of response options created by a response options creator is less than a predefined total response options; and (e) repeating the steps (a) through (c), for a successive batch and for each of the one or more non-transformable questions, by considering (i) the successive batch as the current batch, (ii) the one or more non-transformable questions as the one or more questions, and (iii) the one or more valid responses pertaining to the current batch and the one or more valid responses pertaining to the successive batch together as the one or more valid responses pertaining to the current batch, for each non-transformable question, until one of (i) all of the one or more questions become transformable questions, and (ii) the number of the plurality of batches are completed, is met to transform the qualitative survey questionnaire into a quantitative survey questionnaire.

2. The processor-implemented method of claim 1, wherein applying the transformation decision criterion, for each question, using the associated one or more valid responses pertaining to the current batch, to determine (i) the one or more transformable questions and (ii) the one or more non-transformable questions out of the one or more questions, comprising:

forming one or more synonymous phrase sets, for each question, from the associated one or more valid responses pertaining to the current batch, using the natural language knowledge graph, wherein each synonymous phrase set comprises one or more synonymous phrases present in the associated one or more valid responses;

calculating a frequency of occurrence for each of the one or more synonymous phrase sets, based on a number of the one or more synonymous phrases present in the associated synonymous phrase set, for each question;

identifying one or more synonymous phrase sets having the frequency of occurrence greater than or equal to a synonymous phrase frequency occurrence threshold, for each question;

forming one or more aspect sets, for each question, from the associated one or more valid responses pertaining to the current batch, using the domain taxonomy based on a parent-child relationship, wherein each aspect set comprises one or more aspects present in the associated one or more valid responses;

calculating a frequency of occurrence for each aspect set, based on a number of the one or more aspects present in the associated aspect set, for each question;

identifying one or more aspect sets having the frequency of occurrence greater than or equal to an aspect frequency occurrence threshold, for each question; and determining (i) the one or more transformable questions and (ii) the one or more non-transformable questions, out of the one or more questions, by applying the transformation decision criterion for each question, wherein the transformation decision criterion comprises:

(i) tagging the one or more questions as the non-transformable questions if the current batch is a first batch; and (ii) tagging the one or more questions as the transformable question if (a) a difference in a variance of frequency of occurrence for each aspect set in the current batch and in a previous batch is less than a predefined first threshold, wherein the predefined first threshold is dynamically determined for each batch based on at least one of:
i. a number of batches completed,
ii. a number of batches remaining,
iii. a variance between batch N and batch N−1; and
iv. demographic coverage achieved up to the current batch and an increase in demographic coverage in batch N compared to batch N−1,
and (b) the difference in the variance of frequency of occurrence for each synonymous phrase set in the current batch and in the previous batch, is less than a predefined second threshold, for the question, otherwise adding the associated question to the one or more non-transformable questions.

3. The processor-implemented method of claim 1, wherein creating the one or more quantitative response options, for each transformable question of the one or more transformable questions, using the associated one or more valid responses pertaining to the current batch, comprising:
identifying a representative phrase for each of the one or more synonymous phrase sets having the frequency of occurrence greater than or equal to a synonymous phrase frequency occurrence threshold, based on (i) a higher frequency of occurrence of a synonymous phrase, (ii) a higher relevance index of each synonymous phrase with one or more verbs in the transformable question, (iii) the synonymous phrase having an equivalent distance from other synonymous phrases in the natural language knowledge graph;
identifying a representative aspect for each of the one or more aspect sets having the frequency of occurrence greater than or equal to an aspect frequency occurrence threshold, based on a parent aspect; and
creating the one or more quantitative response options, using the representative phrase for each of the one or more synonymous phrase sets and the representative aspect for each of the one or more aspect sets, with different combinations.

4. The processor-implemented method of claim 3, wherein creating the one or more quantitative response options, for each transformable question, comprising adding 'others' as a quantitative response option for each transformable question, if the number of the one or more quantitative response options created is less than a predefined quantitative response option value.

5. A system comprising:
a memory storing instructions;
one or more input/output (I/O) interfaces; and
one or more hardware processors coupled to the memory via the one or more I/O interfaces,
wherein the one or more hardware processors are configured by the instructions to:
receive (i) a qualitative survey questionnaire comprising one or more questions, wherein the qualitative survey questionnaire is associated with a predefined domain category (ii) a batch size defining a number of a plurality of batches, and a participant size defining a number of a plurality of participants present in each batch, (iii) a plurality of responses received for each question of the one or more questions, from the plurality of participants present in each batch, (iv) a domain taxonomy of the predefined domain category, wherein the domain taxonomy comprises a domain knowledge in an hierarchical order, and (v) a natural language knowledge graph, wherein the natural language knowledge graph is a knowledge graph of english based natural language; and
perform for each question of the one or more questions, using the plurality of responses received for each batch at a time:
(a) determining one or more valid responses for each question, out of the plurality of responses pertaining to a current batch, using the domain taxonomy of the predefined domain category and the natural language knowledge graph based on their semantic relevance, wherein determining the one or more valid responses for each question, out of the plurality of responses pertaining to the current batch, using the domain taxonomy of the predefined domain category and the natural language knowledge graph, comprising:
identifying one or more verbs and one or more aspects from a question, using a natural language processing (NLP) technique and a grammar rule, wherein the identification of the one or more aspects comprises:
applying an aspect extraction technique including a part-of-speech (POS) tagging and a dependency parsing based on the NLP technique; and
determining nouns or noun phrases to represent the aspect;
identifying one or more aspects from each response received for the question, using the NLP technique;
determining an aspect sematic relation score for each response, based on (i) each of the one or more aspects identified from the question and (ii) each of the one or more aspects identified from the associated response, using the domain taxonomy of the predefined domain category, wherein the aspect semantic relation score is computed according to $$SemRelScore_{aspect} = \sum_{i=1}^{n} \sum_{j=1}^{n} RelIndex(q_{aspect_i}, r_{aspect_j}) \quad (1)$$

where,
$q_{aspect_i}$ represents the i-th aspect identified from the question;
$r_{aspect_j}$ represents the j-th aspect identified from the response;
$RelIndex(q_{aspect_i}, r_{aspect_j})$ denotes a relevance index value between 0 and 1, where 1 indicates high relevance and 0 indicates no relevance;
identifying one or more phrases related to one or more verbs identified from the question, from each response associated to the question, using the natural language knowledge graph, wherein total number of relevant verb phrases in each response is calculated according to $$TotalRelVerbPhrases \sum_{i=1}^{n} = Count(phrases\ related\ to\ q_{verb_i}) \quad (2)$$

where:
$q_{verb_i}$ represents the i-th verb identified from the question; and
Count(•) denotes the number of phrases in the response that are semantically related to the corresponding verb;
determining a verb-phrase sematic relation score for each response, based on each of the one or more phrases related to one or more verbs identified from the question, using the natural language knowledge graph, wherein the verb-phrase semantic relation score for each response is calculated according to $$SemRelScore_{VerbPhrase} = \qquad (3)$$
$$TotalRelVerbPhrases \sum_{i=1}^{m} \sum_{j=1}^{m} RelIndex(q_{verb_i}, r_{phrase_j})$$

where:

TotalRelVerbPhrases represents the total number of phrases in the response that are related to the verbs in the question;

$q_{verb_i}$ represents the i-th verb identified from the question;

$r_{phrase_j}$ represents the j-th phrase identified from the response; and $RelIndex(q_{verb_i}, r_{phrase_j})$ denotes a relevance index value ranging from 0 to 1, where 1 indicates high relevance and 0 indicates no relevance;

calculating a response length for each response, based on a number of characters present in the associated response; and determining the one or more valid responses for each question, out of the plurality of responses, based on (i) the aspect sematic relation score for the associated response, wherein the aspect semantic relation score for each response is categorized into one of a plurality of predefined categories comprising low, medium, and high, based on threshold values, (ii) the verb-phrase sematic relation score for the associated response, wherein the verb-phrase semantic relation score for each response is categorized into one of a plurality of predefined categories comprising low, medium, and high, based on threshold values, and (iii) the response length for the associated response, wherein the length of each response is categorized into one of a plurality of predefined categories comprising low, medium, and high, based on threshold values;

(b) applying a transformation decision criterion, for each question, using the associated one or more valid responses pertaining to the current batch, to determine (i) one or more transformable questions and (ii) one or more non-transformable questions, out of the one or more questions;

(c) creating one or more quantitative response options, for each transformable question of the one or more transformable questions, using the associated one or more valid responses pertaining to the current batch;

(d) updating the quantitative survey question with one or more customized response options when number of response options created by a response options creator is less than a predefined total response options; and (e) repeating the steps (a) through (c), for the a successive batch and for each of the one or more non-transformable questions, by considering (i) the successive batch as the current batch, (ii) the one or more non-transformable questions as the one or more questions, and (iii) the one or more valid responses pertaining to the current batch and the one or more valid responses pertaining to the successive batch together as the one or more valid responses pertaining to the current batch, for each non-transformable question, until one of (i) all of the one or more questions become transformable questions, and (ii) the number of the plurality of batches are completed, is met to transform the qualitative survey questionnaire into a quantitative survey questionnaire.

6. The system of claim 5, wherein the one or more hardware processors are configured by the instructions to apply the transformation decision criterion, for each question, using the associated one or more valid responses pertaining to the current batch, to determine (i) the one or more transformable questions and (ii) the one or more non-transformable questions out of the one or more questions, by:

forming one or more synonymous phrase sets, for each question, from the associated one or more valid responses pertaining to the current batch, using the natural language knowledge graph, wherein each synonymous phrase set comprises one or more synonymous phrases present in the associated one or more valid responses;

calculating a frequency of occurrence for each synonymous phrase set, based on a number of the one or more synonymous phrases present in the associated synonymous phrase set, for each question;

identifying one or more synonymous phrase sets having the frequency of occurrence greater than or equal to a synonymous phrase frequency occurrence threshold, for each question;

forming one or more aspect sets, for each question, from the associated one or more valid responses pertaining to the current batch, using the domain taxonomy based on a parent-child relationship, wherein each aspect set comprises one or more aspects present in the associated one or more valid responses;

calculating a frequency of occurrence for each aspect set, based on a number of the one or more aspects present in the associated aspect set, for each question;

identifying one or more aspect sets having the frequency of occurrence greater than or equal to an aspect frequency occurrence threshold, for each question; and determining (i) the one or more transformable questions and (ii) the one or more non-transformable questions, out of the one or more questions, by applying the transformation decision criterion for each question, wherein the transformation decision criterion comprises:

(i) tagging the one or more questions as the non-transformable questions if the current batch is a first batch; and (ii) tagging the one or more questions as the transformable question is (a) a difference in a variance of frequency of occurrence for each aspect set in the current batch and in a previous batch is less than a predefined first threshold, wherein the predefined first threshold is dynamically determined for each batch based on at least one of:

i. a number of batches completed, ii. a number of batches remaining, iii. a variance between batch N and batch N−1; and iv. demographic coverage achieved up to the current batch and an increase in demographic coverage in batch N compared to batch N−1, and (b) if the difference in the variance of frequency of occurrence for each synonymous phrase set in the current batch and in the previous batch, is less than a predefined second threshold, for the question, otherwise adding the associated question to the one or more non-transformable questions.

7. The system of claim 5, wherein the one or more hardware processors are configured by the instructions to create the one or more quantitative response options, for each transformable question of the one or more transformable questions, using the associated one or more valid responses pertaining to the current batch, by:

identifying a representative phrase for each of the one or more synonymous phrase sets having the frequency of occurrence greater than or equal to a synonymous phrase frequency occurrence threshold, based on (i) a higher frequency of occurrence of a synonymous phrase, (ii) a higher relevance index of each synonymous phrase with one or more verbs in the transformable question, (iii) the synonymous phrase having an equivalent distance from other synonymous phrases in the natural language knowledge graph;

identifying a representative aspect for each of the one or more aspect sets having the frequency of occurrence greater than or equal to an aspect frequency occurrence threshold, based on a parent aspect; and creating the one or more quantitative response options, using the representative phrase for each of the one or more synonymous phrase sets and the representative aspect for each of the one or more aspect sets, with different combinations.

8. The system of claim 7, wherein the one or more hardware processors are further configured by the instructions to create the one or more quantitative response options, for each transformable question, by adding 'others' as a quantitative response option for each transformable question, if the number of the one or more quantitative response options created is less than a predefined quantitative response option value.

9. One or more non-transitory machine-readable information storage mediums comprising one or more instructions which when executed by one or more hardware processors cause:

receiving, (i) a qualitative survey questionnaire comprising one or more questions, wherein the qualitative survey questionnaire is associated with a predefined domain category (ii) a batch size defining a number of a plurality of batches, and a participant size defining a number of a plurality of participants present in each batch, (iii) a plurality of responses received for each question of the one or more questions, from the plurality of participants present in each batch, (iv) a domain taxonomy of the predefined domain category, wherein the domain taxonomy comprises a domain knowledge in an hierarchical order, and (v) a natural language knowledge graph, wherein the natural language knowledge graph is a knowledge graph of english based natural language; and performing, for each question of the one or more questions, using the plurality of responses received for each batch at a time:

(a) determining one or more valid responses for each question, out of the plurality of responses pertaining to a current batch, using the domain taxonomy of the predefined domain category and the natural language knowledge graph based on their semantic relevance, wherein determining the one or more valid responses for each question, out of the plurality of responses pertaining to the current batch, using the domain taxonomy of the predefined domain category and the natural language knowledge graph, comprising:

identifying one or more verbs and one or more aspects from a question, using a natural language processing (NLP) technique and a grammar rule, wherein the identification of the one or more aspects comprises:

applying an aspect extraction technique including a part-of-speech (POS) tagging and a dependency parsing based on the NLP technique; and determining nouns or noun phrases to represent the aspect;

identifying one or more aspects from each response received for the question, using the NLP technique;

determining an aspect sematic relation score for each response, based on (i) each of the one or more aspects identified from the question and (ii) each of the one or more aspects identified from the associated response, using the domain taxonomy of the predefined domain category, wherein the aspect semantic relation score is computed according to $$SemRelScore_{aspect} = \sum_{i=1}^{n} \sum_{j=1}^{n} RelIndex(q_{aspect_i}, r_{aspect_j}) \quad (1)$$

where, $q_{aspect_i}$ represents the i-th aspect identified from the question;

$r_{aspect_j}$ represents the j-th aspect identified from the response;

$RelIndex(q_{aspect_i}, r_{aspect_j})$ denotes a relevance index value between 0 and 1, where 1 indicates high relevance and 0 indicates no relevance;

identifying one or more phrases related to one or more verbs identified from the question, from each response associated to the question, using the natural language knowledge graph, wherein total number of relevant verb phrases in each response is calculated according to $$TotalRelVerbPhrases \sum_{i=1}^{n} = Count(\text{phrases related to } q_{verb_i}) \quad (2)$$

where:

$q_{verb_i}$ represents the i-th verb identified from the question; and

Count(•) denotes the number of phrases in the response that are semantically related to the corresponding verb;

determining a verb-phrase sematic relation score for each response, based on each of the one or more phrases related to one or more verbs identified from the question, using the natural language knowledge graph, wherein the verb-phrase semantic relation score for each response is calculated according to $$SemRelScore_{VerbPhrase} = \quad (3)$$
$$TotalRelVerbPhrases \sum_{i=1}^{m} \sum_{j=1}^{m} RelIndex(q_{verb_i}, r_{phrase_j})$$

where:

TotalRelVerbPhrases represents the total number of phrases in the response that are related to the verbs in the question;

$q_{verb_i}$ represents the i-th verb identified from the question;

$r_{phrase_j}$ represents the j-th phrase identified from the response; and

RelIndex($q_{verb_j}$, $r_{phrase_j}$) denotes a relevance index value ranging from 0 to 1, where 1 indicates high relevance and 0 indicates no relevance;

calculating a response length for each response, based on a number of characters present in the associated response; and determining the one or more valid responses for each question, out of the plurality of responses, based on (i) the aspect sematic relation score for the associated response, wherein the aspect semantic relation score for each response is categorized into one of a plurality of predefined categories comprising low, medium, and high, based on threshold values, (ii) the verb-phrase sematic relation score for the associated response, wherein the verb-phrase semantic relation score for each response is categorized into one of a plurality of predefined categories comprising low, medium, and high, based on threshold values, and (iii) the response length for the associated response, wherein the length of each response is categorized into one of a plurality of predefined categories comprising low, medium, and high, based on threshold values;

(b) applying a transformation decision criterion, for each question, using the associated one or more valid responses pertaining to the current batch, to determine (i) one or more transformable questions and (ii) one or more non-transformable questions, out of the one or more questions;

(c) creating one or more quantitative response options, for each transformable question of the one or more transformable questions, using the associated one or more valid responses pertaining to the current batch;

(d) updating the quantitative survey question with one or more customized response options when number of response options created by a response options creator is less than a predefined total response options; and (e) repeating the steps (a) through (c), for a successive batch and for each of the one or more non-transformable questions, by considering (i) the successive batch as the current batch, (ii) the one or more non-transformable questions as the one or more questions, and (iii) the one or more valid responses pertaining to the current batch and the one or more valid responses pertaining to the successive batch together as the one or more valid responses pertaining to the current batch, for each non-transformable question, until one of (i) all of the one or more questions become transformable questions, and (ii) the number of the plurality of batches are completed, is met to transform the qualitative survey questionnaire into a quantitative survey questionnaire.

10. The one or more non-transitory machine-readable information storage mediums of claim 9, wherein applying the transformation decision criterion, for each question, using the associated one or more valid responses pertaining to the current batch, to determine (i) the one or more transformable questions and (ii) the one or more non-transformable questions out of the one or more questions, comprising:

forming one or more synonymous phrase sets, for each question, from the associated one or more valid responses pertaining to the current batch, using the natural language knowledge graph, wherein each synonymous phrase set comprises one or more synonymous phrases present in the associated one or more valid responses;

calculating a frequency of occurrence for each of the one or more synonymous phrase sets, based on a number of the one or more synonymous phrases present in the associated synonymous phrase set, for each question;

identifying one or more synonymous phrase sets having the frequency of occurrence greater than or equal to a synonymous phrase frequency occurrence threshold, for each question;

forming one or more aspect sets, for each question, from the associated one or more valid responses pertaining to the current batch, using the domain taxonomy based on a parent-child relationship, wherein each aspect set comprises one or more aspects present in the associated one or more valid responses;

calculating a frequency of occurrence for each aspect set, based on a number of the one or more aspects present in the associated aspect set, for each question;

identifying one or more aspect sets having the frequency of occurrence greater than or equal to an aspect frequency occurrence threshold, for each question; and determining (i) the one or more transformable questions and (ii) the one or more non-transformable questions, out of the one or more questions, by applying the transformation decision criterion for each question, wherein the transformation decision criterion comprises:

(i) tagging the one or more questions as the non-transformable questions if the current batch is a first batch; and (ii) tagging the one or more questions as the transformable question if (a) a difference in a variance of frequency of occurrence for each aspect set in the current batch and in a previous batch is less than a predefined first threshold, wherein the predefined first threshold is dynamically determined for each batch based on at least one of:

i. a number of batches completed, ii. a number of batches remaining, iii. a variance between batch N and batch N−1; and iv. demographic coverage achieved up to the current batch and an increase in demographic coverage in batch N compared to batch N−1, and (b) the difference in the variance of frequency of occurrence for each synonymous phrase set in the current batch and in the previous batch, is less than a predefined second threshold, for the question, otherwise adding the associated question to the one or more non-transformable questions.

11. The one or more non-transitory machine-readable information storage mediums of claim 9, wherein creating the one or more quantitative response options, for each transformable question of the one or more transformable questions, using the associated one or more valid responses pertaining to the current batch, comprising:

identifying a representative phrase for each of the one or more synonymous phrase sets having the frequency of occurrence greater than or equal to a synonymous phrase frequency occurrence threshold, based on (i) a higher frequency of occurrence of a synonymous phrase, (ii) a higher relevance index of each synonymous phrase with one or more verbs in the transformable question, (iii) the synonymous phrase having an equivalent distance from other synonymous phrases in the natural language knowledge graph;

identifying a representative aspect for each of the one or more aspect sets having the frequency of occurrence greater than or equal to an aspect frequency occurrence threshold, based on a parent aspect; and creating the one or more quantitative response options, using the representative phrase for each of the one or more synonymous phrase sets and the representative aspect for each of the one or more aspect sets, with different combinations.

12. The one or more non-transitory machine-readable information storage mediums of claim 11, wherein creating the one or more quantitative response options, for each transformable question, comprising adding 'others' as a quantitative response option for each transformable question, if the number of the one or more quantitative response options created is less than a predefined quantitative response option value.

34

* * * * *